(12) United States Patent
Bai

(10) Patent No.: US 10,355,738 B1
(45) Date of Patent: Jul. 16, 2019

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/196,881

(22) Filed: Nov. 20, 2018

(30) Foreign Application Priority Data

Mar. 16, 2018 (CN) .......................... 2018 1 0220713

(51) Int. Cl.
*H04B 1/401* (2015.01)
*H04B 1/44* (2006.01)
(Continued)

(52) U.S. Cl.
CPC ............. *H04B 1/401* (2013.01); *H04B 1/006* (2013.01); *H04B 1/0057* (2013.01); *H04B 1/44* (2013.01);
(Continued)

(58) Field of Classification Search
CPC ...... H04B 1/401; H04B 1/0057; H04B 1/006; H04B 1/44; H04B 7/0413; H04L 5/005; H04L 5/0035
See application file for complete search history.

(56) References Cited

U.S. PATENT DOCUMENTS 5,175,878 A * 12/1992 Davis ...................... H01Q 3/24
455/103
8,824,584 B2 * 9/2014 Kim ..................... H04B 7/0413
375/267
(Continued)

FOREIGN PATENT DOCUMENTS

CN 101867402 A 10/2010
CN 202103661 U 1/2012
(Continued)

OTHER PUBLICATIONS

International search report issued in corresponding international application No. PCT/CN2018/111027 dated Jan. 17, 2019.
(Continued)

*Primary Examiner* — Lewis G West
(74) *Attorney, Agent, or Firm* — Young Basile Hanlon & MacFarlane, P.C.

(57) ABSTRACT

A multiway switch, a radio frequency system, and a wireless communication device are provided. The multiway switch includes twelve throw (T) ports and four pole (P) ports. The twelve T ports include four first T ports and each first T port is coupled with all of the four P ports. The multiway switch is configured to be coupled with a radio frequency circuit and an antenna system of an electronic device operable in a dual-frequency dual-transmit mode, to enable a preset function of the electronic device, the antenna system includes four antennas corresponding to the four P ports, and the preset function is a function of transmitting a sounding reference signal (SRS) through the four antennas in turn.

20 Claims, 15 Drawing Sheets

(51) Int. Cl.
*H04B 1/00* (2006.01)
*H04L 5/00* (2006.01)
*H04B 7/0413* (2017.01)

(52) U.S. Cl.
CPC ............ *H04L 5/005* (2013.01); *H04L 5/0035* (2013.01); *H04B 7/0413* (2013.01)

(56) References Cited

U.S. PATENT DOCUMENTS

| | | | |
|---|---|---|---|
| 9,385,795 B1* | 7/2016 | Ananthanarayanan | ... H04L 5/08 |
| 9,584,211 B2* | 2/2017 | Kang | .................... H04B 7/0413 |
| 2009/0054093 A1 | 2/2009 | Kim et al. | |
| 2009/0153222 A1* | 6/2009 | Gu | ..................... H03K 17/002 327/365 |
| 2011/0249760 A1* | 10/2011 | Chrisikos | ............... H01Q 1/243 375/259 |
| 2011/0250926 A1* | 10/2011 | Wietfeldt | ............... H01Q 1/243 455/525 |
| 2013/0308554 A1 | 11/2013 | Ngai et al. | |
| 2013/0309982 A1* | 11/2013 | Yan | ..................... H04B 7/0608 455/79 |
| 2014/0140224 A1* | 5/2014 | Hakansson | .......... H04B 7/0608 370/252 |
| 2014/0235260 A1* | 8/2014 | Zawaideh | ............. H04W 88/06 455/452.1 |
| 2014/0293841 A1 | 10/2014 | Rousu | |
| 2014/0334362 A1* | 11/2014 | Granger-Jones | .......... H04L 5/08 370/297 |
| 2015/0215011 A1* | 7/2015 | Hartenstein | .............. H04B 7/02 375/267 |
| 2015/0295594 A1* | 10/2015 | Kehrer | .................... H04B 1/006 375/316 |
| 2016/0006409 A1* | 1/2016 | Keane | .................... H03H 7/465 333/103 |
| 2016/0337178 A1* | 11/2016 | Frenne | ................ H04L 41/0803 |
| 2017/0012358 A1* | 1/2017 | Feng | ......................... H04B 7/10 |
| 2017/0195004 A1 | 7/2017 | Cheng et al. | |
| 2017/0202014 A1* | 7/2017 | Moon | .................. H04B 7/0626 |
| 2018/0367199 A1* | 12/2018 | Zimmerman | ......... H01Q 3/2605 |

FOREIGN PATENT DOCUMENTS

| | | |
|---|---|---|
| CN | 103905104 A | 7/2014 |
| CN | 105245295 A | 1/2016 |
| CN | 106533526 A | 3/2017 |
| CN | 106559277 A | 4/2017 |
| CN | 106685621 A | 5/2017 |
| CN | 106712795 A | 5/2017 |
| CN | 108199730 A | 6/2018 |
| CN | 108462499 A | 8/2018 |
| CN | 108462506 A | 8/2018 |
| CN | 108512556 A | 9/2018 |
| WO | 2012026601 A1 | 3/2012 |

OTHER PUBLICATIONS

Gao Xiang et al: "Multi-Switch for Antenna Selection in Massive MIMO", 2015 IEEE Global Communications Conference (GLOBECOM), IEEE, Dec. 6, 2015 (Dec. 6, 2015), pp. 1-6, XP032872922, DOI: 10.1109/OCOM.2014.7417765 [retrieved on Feb. 23, 2016] abstract; figures 1,2,5,6; sections I, III.B, III.C.
Guy Lemieux et al: "Generating highly-routable sparse crossbars for PLDs", FPGA'00. ACM/SIGDA International Symposium on Field Programmable Gate Arrays. Monterey, CA, Feb. 9-11, 2000; [ACM/SIGDA International Symposium on Field Programmable Gate Arrays], New York, NY : ACM, US, Feb. 1, 2000 (Feb. 1, 2000), pp. 155-164, XP058160667, DOI: 10.1145/329166.329199 ISBN: 978-1-58113-193-2. abstract, figure 1, Section 2 *.
Extended European search report issued in corresponding European application No. 18202826.6 dated May 29, 2019.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220713.7, filed on Mar. 16, 2018, the entire disclosure of which is hereby incorporated by reference.

TECHNICAL FIELD

This disclosure relates to the field of communication technologies, and more particularly to a multiway switch, a radio frequency system, and a wireless communication device.

BACKGROUND

With the popularity of electronic devices such as smart phones, the smart phone can support an increasing number of applications and is becoming more and more powerful. The smart phone is developing in a diversified and personalized way, becoming an indispensable electronic product in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, requirements on an electronic device supporting a four-antenna RF system architecture are proposed.

SUMMARY

Implementations of the disclosure provide a multiway switch, a radio frequency system, and a wireless communication device.

According to a first aspect of the disclosure, a multiway switch is provided. The multiway switch includes twelve throw (T) ports and four pole (P) ports. The twelve T ports include four first T ports and each first T port is coupled with all of the four P ports.

The multiway switch is configured to be coupled with a radio frequency circuit and an antenna system of an electronic device operable in a dual-frequency dual-transmit mode, to enable a preset function of the electronic device, the antenna system includes four antennas corresponding to the four P ports, and the preset function is a function of transmitting a sounding reference signal (SRS) through the four antennas in turn.

According to a second aspect of the disclosure, a radio frequency system is provided. The radio frequency system includes an antenna system, a radio frequency transceiver, a radio frequency circuit coupled with the radio frequency transceiver, and a multiway switch coupled with the radio frequency circuit and the antenna system. The multiway switch includes twelve T ports and four P ports. The twelve T ports include four first T ports and each first T port is coupled with all of the four P ports. The antenna system includes four antennas corresponding to the four P ports.

The multiway switch is configured to enable a preset function of transmitting an SRS through the four antennas in turn.

According to a third aspect of the disclosure, a wireless communication device is provided. The wireless communication device includes a radio frequency transceiver, a radio frequency circuit coupled with the radio frequency transceiver, an antenna system, and a multiway switch coupled with the radio frequency circuit and the antenna system. The antenna system includes four antennas. The multiway switch includes twelve T ports and four P ports. The twelve T ports include four first T ports supporting only a transmission function and eight second T ports supporting only a reception function. Each first T port is coupled with all of the four P ports. Each second T port is coupled with one of the four P ports, and any two second T ports operable at the same frequency band are coupled with different P ports of the four P ports. Each of the four P ports is coupled with a corresponding antenna.

The multiway switch is configured to enable a preset function of transmitting an SRS through the four antennas corresponding to the four P ports in turn.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
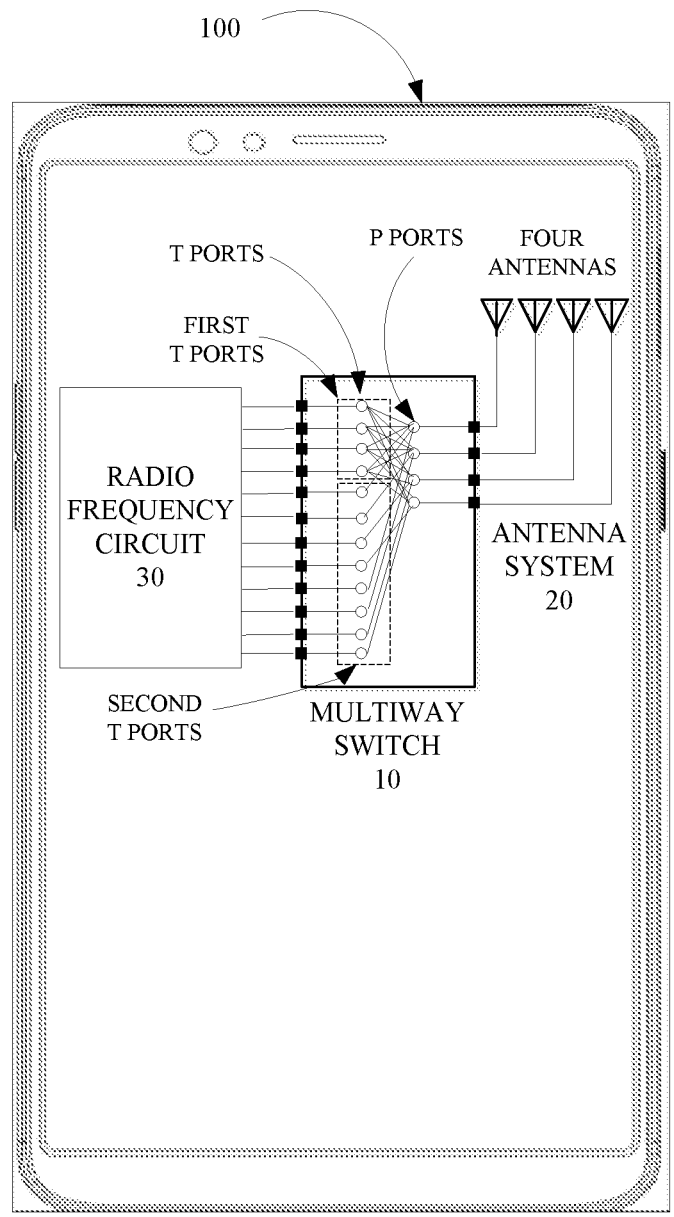
FIG. 1 is a schematic structural diagram illustrating a multiway switch according to an implementation of the present disclosure.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompanying drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The electronic device involved in the implementations of the disclosure may include various handheld devices, in-vehicle devices, wearable devices, computing devices that have wireless communication functions or other processing devices connected to wireless modems, as well as various forms of user equipments (UE), mobile stations (MS), terminal devices, and the like. For the convenience of description, the above-mentioned devices are collectively referred to as an electronic device.

At present, sounding reference signal (SRS) transmission via four antennas switching of a mobile phone is a mandatory option for the China mobile communications corporation (CMCC) in the China mobile fifth generation (5G) Scale Test Technology White Paper_Terminal, which is optional in the third generation partnership project (3GPP). Its main purpose is for a base station to determine quality and parameters of four channels via detecting uplink signals of four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

To satisfy requirements of SRS transmission via four antennas switching, a radio frequency architecture based on a simplified 4PnT antenna switch is proposed in the implementations of the disclosure. Compared with a 3P3T/DPDT/multiway small switch switching scheme, the present switching scheme can reduce the number of series switches in each path by integrating all or part of switches into the 4PnT switch, thereby reducing link loss and optimizing the overall transmission and reception performance of the terminal. The implementations of the present application are described in detail below.

In the context of the disclosure, the abbreviation "LNA" refers to a low-noise amplifier and the abbreviation "PA" refers to a power amplifier.

In the context of the disclosure, "P port" is the abbreviation of "pole port", which refers to ports coupled with antennas of a multiway switch. Also, "T port" is the abbreviation of "throw port", which refers to ports coupled with radio frequency modules of the multiway switch. The multiway switch is a three-pole three-throw (3P3T) switch for example.

According to an implementation of the disclosure, a multiway switch is provided. The multiway switch includes twelve T ports and four P ports. The twelve T ports include four first T ports and each first T port is coupled with all of the four P ports. The multiway switch is configured to be coupled with a radio frequency circuit and an antenna system of an electronic device operable in a dual-frequency dual-transmit mode, to enable a preset function of the electronic device. The antenna system includes four antennas corresponding to the four P ports. The preset function is a function of transmitting an SRS through the four antennas in turn.

FIG. 1 is a schematic structural diagram illustrating a multiway switch 10 according to an implementation of the present disclosure. As illustrated in FIG. 1, the multiway switch 10 is applicable to an electronic device 100. The electronic device 100 is operable in a dual-frequency dual-transmit mode as well as includes an antenna system 20 and a radio frequency circuit 30. The antenna system 20 includes four antennas. The multiway switch 10 includes twelve T ports and four P ports, and the twelve T ports include four first T ports and each first T port is coupled with all of the four P ports (that is, fully-coupled). The four antennas correspond to the four P ports; specifically, the four antennas and the four P ports are in one-to-one correspondence.

The multiway switch 10 is configured to be coupled with the radio frequency circuit 30 and the antenna system 20 to enable a preset function of the electronic device 100, where the preset function is a function of transmitting an SRS through the four antennas corresponding to the four P ports in turn, which can be understood as a four-port SRS function.

The transmit antennas refer to antennas supporting a transmission function (that is, a signal transmission function) of the four antennas.

The electronic device 100 can be a mobile phone or other terminal devices supporting the fifth generation new radio (5G NR), such as a customer premise equipment (CPE) or a portable broadband wireless device (for example, a mobile wifi, MIFI).

The concept of coupling, full coupling, or other kinds of coupling between the T ports and the P ports of the multiway switch described in the implementations of the disclosure refers to a state in which the T ports are coupled with the P ports through first switch transistors. It should be noted that, one T port or one P port may be one port of a second switch transistor. The first switch transistor is configured to control a path between the T port and the P port to be turned on (for example, unidirectional conduction from the T port to the P port or from the P port to the T port). The first switch transistor can be, for example, a switch array composed of three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (i.e., a T port or a P port) and can be, for example, a MOS transistor. It should be noted that, the specific configurations of the first switch transistor and the second switch transistor are not limited herein. In an implementation, the electronic device can control paths between the T port and the P port to switch on through the first switch transistor. In another implementation, the electronic device can be provided with a dedicated controller to be coupled with switch transistors of the multiway switch.

The transmitting an SRS through the four antennas corresponding to the four P ports in turn refers to a process in which an electronic device interacts with a base station based on a polling mechanism to determine quality of an uplink channel corresponding to each antenna.

In some implementations, in addition to the four first T ports, the twelve T ports further include eight second T ports. Each of the eight second T ports is coupled with one of the four P ports, and any second T ports of same frequency band are coupled with different P ports of the four P ports. Each of the four P ports is coupled with a corresponding antenna (in other words, the four P ports are in one-to-one correspondence with the four antennas). The four first T ports only support a transmission function; the eight second T ports only support a reception function.

Since the twelve T ports include the four first T ports, each first T port is fully coupled with the four P ports, and each of the other T ports (i.e., the eight second T ports) is only coupled with one fixed antenna for receiving, it is possible to reduce the number of field-effect transistors (FETs) built-in a four-pole twelve-throw (4P12T) switch, reduce the volume and cost of the 4P12T switch, and improve performance of the 4P12T switch as well. The following will be described in detail.

The dual-frequency dual-transmit mode mentioned-above refers to an operating mode in which the electronic device can support dual frequency band-two uplink (UL) transmit paths or dual frequency band-four downlink (DL) receive paths.

Figure 2:
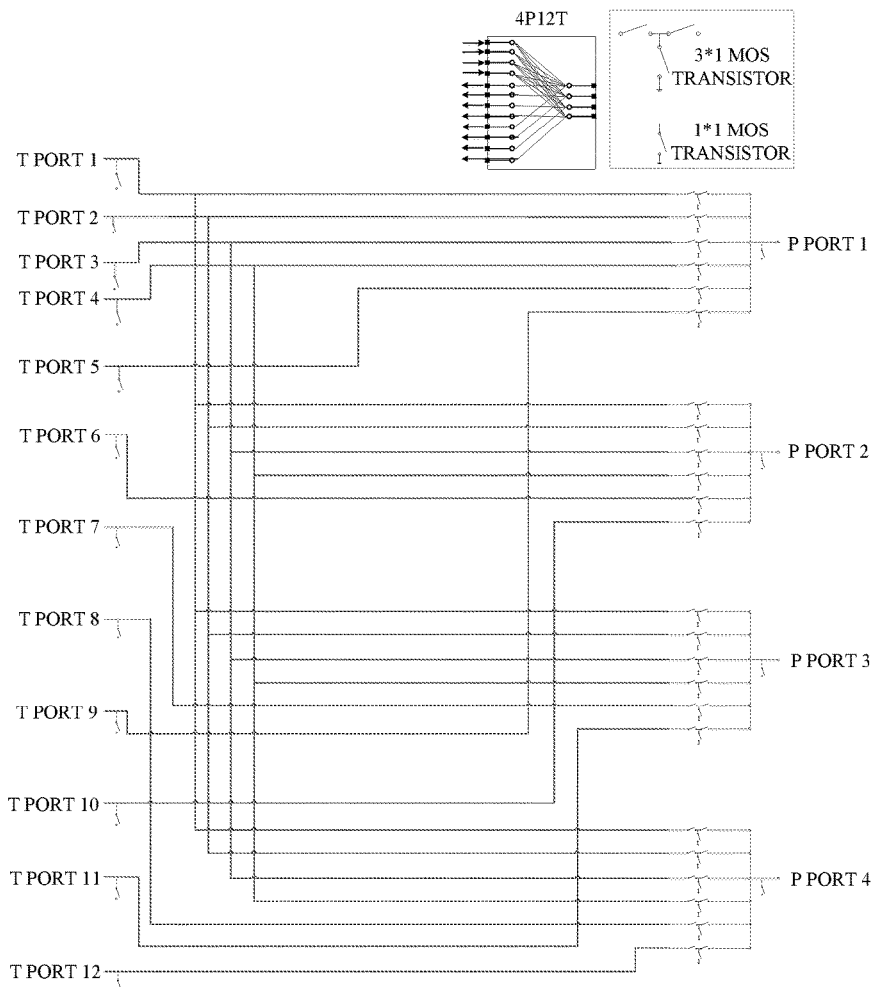
FIG. 2 is a schematic structural diagram illustrating a multiway switch according to an implementation of the present disclosure.

In one implementation, the electronic device logically includes eight receiver circuits and four transmitter circuits, since the electronic device includes twelve T ports and supports four-path-transmission, as illustrated in FIG. 2, the number of metal-oxide-semiconductor (MOS) of a multiway switch is 16=(4*4+(12−4)*1)*3=88. Each of the four transmitter circuits corresponds to one of four first ports, and each first port is configured to be coupled with one of four first T ports of the multiway switch; also, each of the eight receiver circuits corresponds to one of eight second ports, and each second port is configured to be coupled with one of eight second T ports of the multiway switch.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 3:
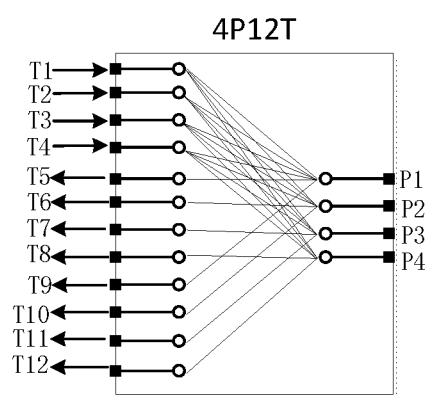
FIG. 3 is a schematic structural diagram illustrating a multiway switch corresponding to a structure illustrated in FIG. 2 according to an implementation of the present disclosure.

FIG. 3 is a schematic structural diagram illustrating a multiway switch corresponding to a structure illustrated in FIG. 2 according to an implementation of the present disclosure. As illustrated in FIG. 3, the multiway switch includes twelve T ports and four P ports. The twelve T ports are respectively marked as T1, T2, T3, T4, T5, T6, T7, T8, T9, T10, T11, and T12; the four P ports are respectively marked as P1, P2, P3, and P4. As one implementation, T1, T2, T3, and T4 are configured as TX ports supporting a transmission function; T5, T6, T7, T8, T9, T10, T11, and T12 are configured as RX ports supporting only a reception function. Each of the four P ports is coupled with a port of the antenna system (that is, each of the four P ports is coupled with a corresponding antenna). It should be understood that, the ports T1, T2, T3, T4 T5, T6, T7, T8, T9, T10, T11, T12, P1, P2, P3, and P4 are only illustrative ports, and the implementations of the disclosure are not limited thereto.

It should be noted that, a coupling manner of the radio frequency circuit and the multiway switch includes but not limited to the structure of FIG. 3, and is merely an example herein.

Figure 4:
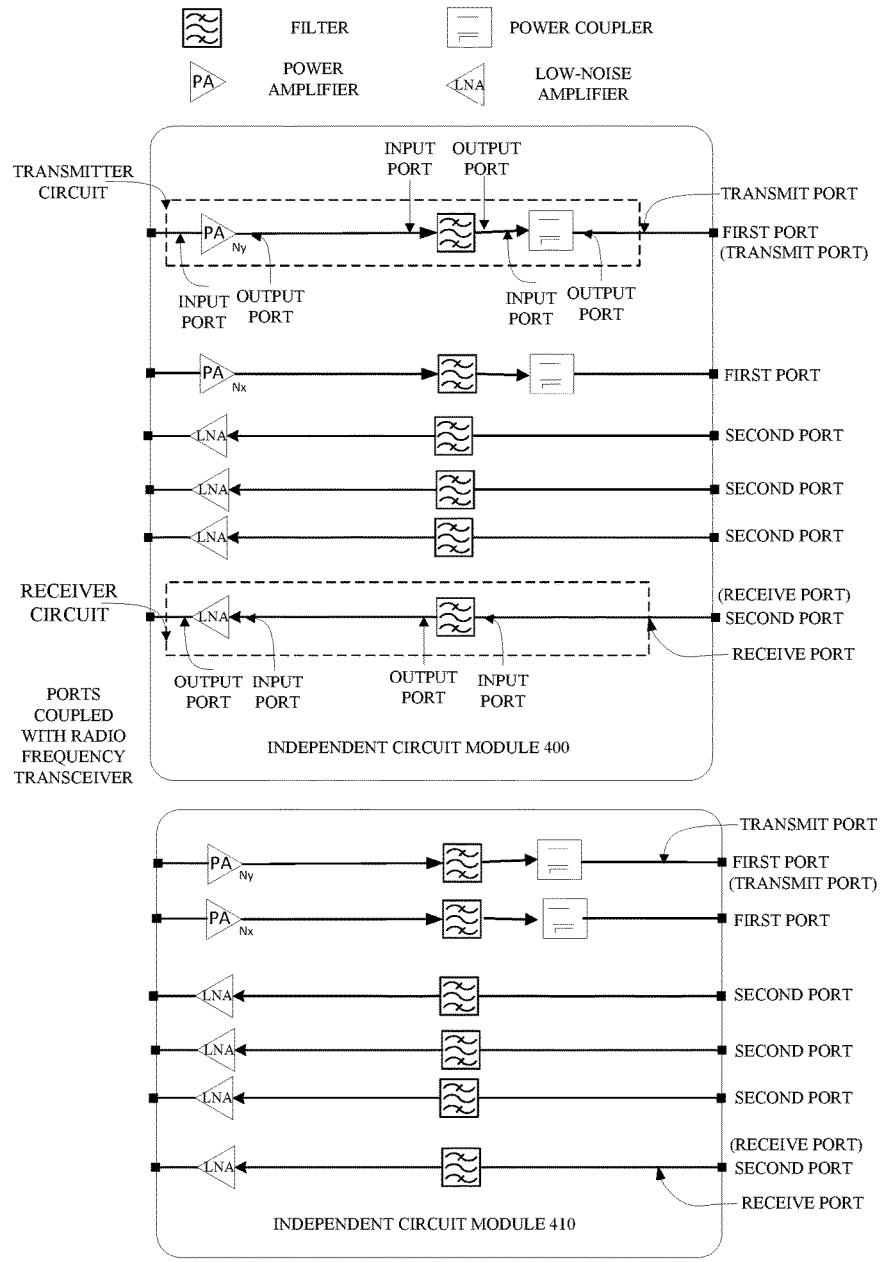
FIG. 4 is a schematic structural diagram illustrating a radio frequency circuit according to an implementation of the present disclosure.

In a possible implementation, as illustrated in FIG. 4, the radio frequency circuit of the electronic device logically includes four transmitter circuits and eight receiver circuits. The radio frequency circuit physically includes two independent circuit modules. The two independent circuit modules have multiple transmit ports and multiple receive ports. Each transmit port is configured to be coupled with a corresponding first T port (i.e., one of four first T ports) and each receive port is configured to be coupled with a corresponding second T port (i.e., one of eight second T ports). That is, the multiple transmit ports of the two independent circuit modules and multiple first T ports of the multiway switch are in one-to-one correspondence, and the multiple receive ports of the two independent circuit modules and multiple second T ports of the multiway switch are in one-to-one correspondence.

As one implementation, the two independent circuit modules include one first independent circuit module and one second independent circuit module. The first independent circuit module is embodied as an independent circuit module 400 and the second independent circuit module is embodied as an independent circuit module 410. The independent circuit module 400 and the independent circuit module 410 each include multiple first ports and multiple second ports. Each first port is configured to be coupled with one of the four first T ports of the multiway switch and each second port is configured to be coupled with one of the eight second T ports of the multiway switch.

The independent circuit module 400 includes two transmitter circuits operable at different working frequency bands and four receiver circuits, each of the two transmitter circuits of the independent circuit module 400 has one transmit port coupled with one of the first ports of the independent circuit module 400, and each of the four receiver circuits of the independent circuit module 400 has one receive port coupled with one of the second ports of the independent circuit module 400.

The independent circuit module 410 includes two transmitter circuits operable at different working frequency bands and four receiver circuits, each of the two transmitter circuits of the independent circuit module 410 has one transmit port coupled with one of the first ports of the independent circuit module 410, and each of the four receiver circuits of the independent circuit module 410 has one receive port coupled with one of the second ports of the independent circuit module 410.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 5:
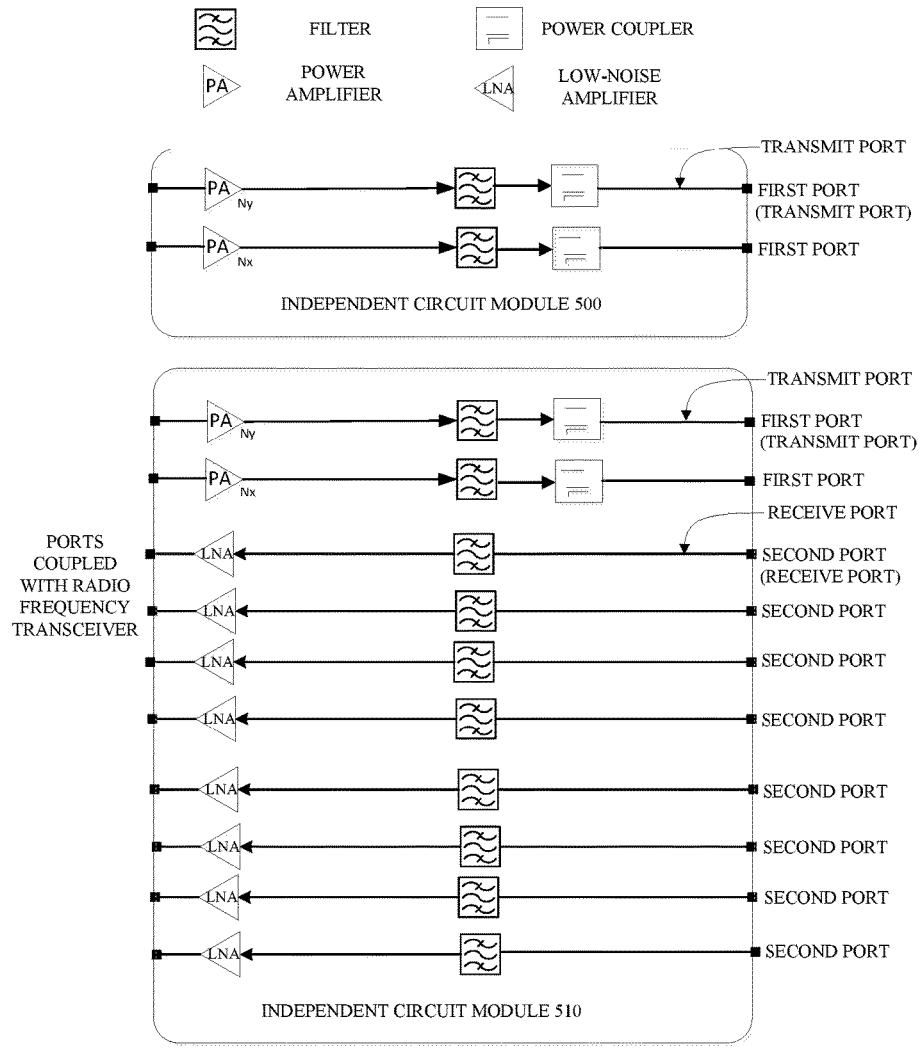
FIG. 5 is yet another schematic structural diagram illustrating a radio frequency circuit according to an implementation of the present disclosure.

In a possible implementation, as illustrated in FIG. 5, the radio frequency circuit of the electronic device logically includes four transmitter circuits and eight receiver circuits. The radio frequency circuit physically includes two independent circuit modules. The two independent circuit modules have multiple transmit ports and multiple receive ports. Each transmit port is configured to be coupled with a corresponding first T port (i.e., one of four first T ports) and each receive port is configured to be coupled with a corresponding second T port (i.e., one of eight second T ports). That is, the multiple transmit ports of the two independent circuit modules and multiple first T ports of the multiway switch are in one-to-one correspondence, and the multiple receive ports of the two independent circuit modules and multiple second T ports of the multiway switch are in one-to-one correspondence.

As one implementation, the two independent circuit modules include one first independent circuit module and one second independent circuit module. The first independent circuit module is embodied as an independent circuit module 500 and the second independent circuit module is embodied as an independent circuit module 510. The independent circuit module 500 includes multiple first ports, and each first port of the independent circuit module 500 is configured to be coupled with one of the four first T ports of the multiway switch. The independent circuit module 510 includes multiple first ports and multiple second ports, each first port of the independent circuit module 510 is configured to be coupled with one of the four first T ports of the multiway switch, and each second port is configured to be coupled with one of the eight second T ports of the multiway switch.

The independent circuit module 500 includes two transmitter circuits of different working frequency bands, and each of the two transmitter circuit of the independent circuit module 500 has one transmit port coupled with one of the first ports of the independent circuit module 500.

The independent circuit module 510 includes two transmitter circuits of different working frequency bands and eight receiver circuits, each of the two transmitter circuits of the independent circuit module 510 has one transmit port coupled with one of the first ports of the independent circuit module 510, and each of the eight receiver circuits has one receive port coupled with one of the second ports of the independent circuit module 510.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 6:
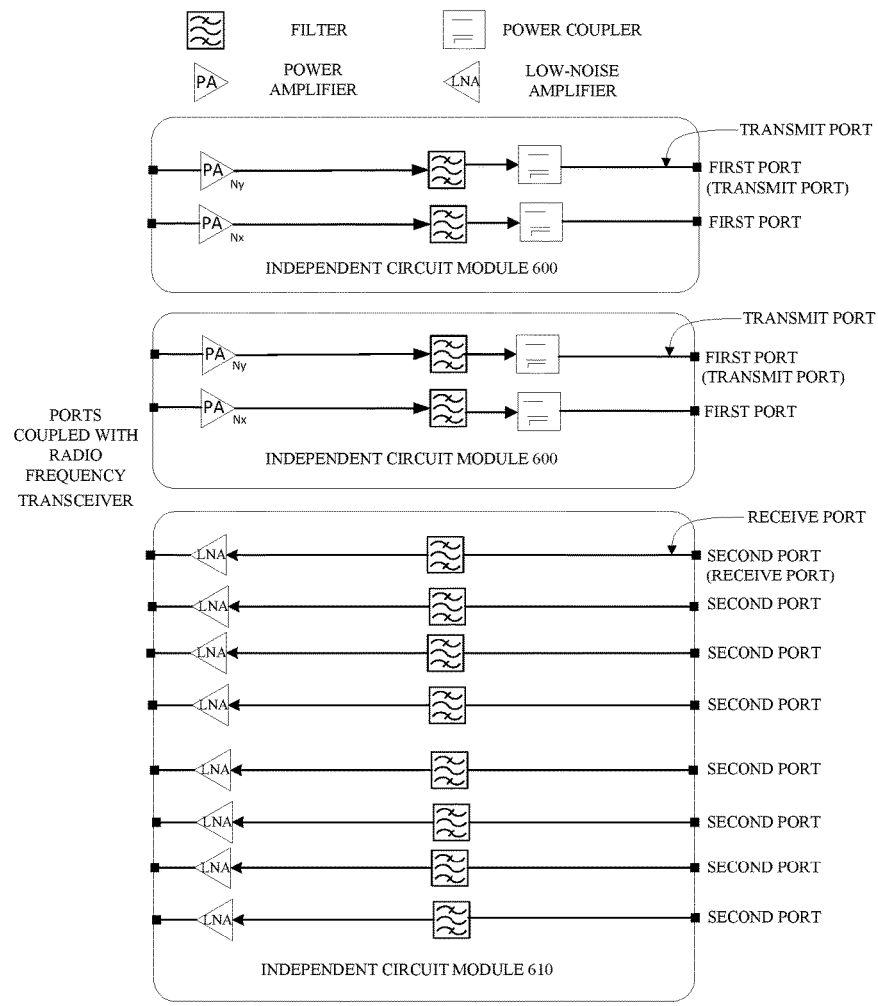
FIG. 6 is still another schematic structural diagram illustrating a radio frequency circuit according to an implementation of the present disclosure.

In a possible implementation, as illustrated in FIG. 6, the radio frequency circuit of the electronic device logically includes four transmitter circuits and eight receiver circuits. The radio frequency circuit physically includes three independent circuit modules. At least one of the three independent circuit modules includes multiple transmit ports, and each transmit port is configured to be coupled with a corresponding first T port (i.e., one of four first T ports). The three independent circuit modules have multiple receive ports, and each receive port is configured to be coupled with a corresponding second T port (i.e., one of eight second T ports). That is, the multiple transmit ports of the three independent circuit modules and multiple first T ports of the multiway switch are in one-to-one correspondence, and the multiple receive ports of the three independent circuit modules and multiple second T ports of the multiway switch are in one-to-one correspondence.

As one implementation, the three independent circuit modules include two first independent circuit modules and one second independent circuit module. The two first independent circuit modules are embodied as two independent circuit modules 600 and the second independent circuit module is embodied as an independent circuit module 610. The independent circuit module 600 includes multiple first ports, and each first port is configured to be coupled with one of the four first T ports of the multiway switch. The independent circuit module 610 includes multiple second ports, and each second port is configured to be coupled with one of the eight second T ports of the multiway switch.

The independent circuit module 600 includes two transmitter circuits operable at different working frequency bands, and each of the two transmitter circuits has one transmit port coupled with one of the first ports of the independent circuit module 600.

The independent circuit module 610 includes eight receiver circuits, and each of the eight receiver circuits has one receive port coupled with one of the second ports of the independent circuit module 610.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 7:
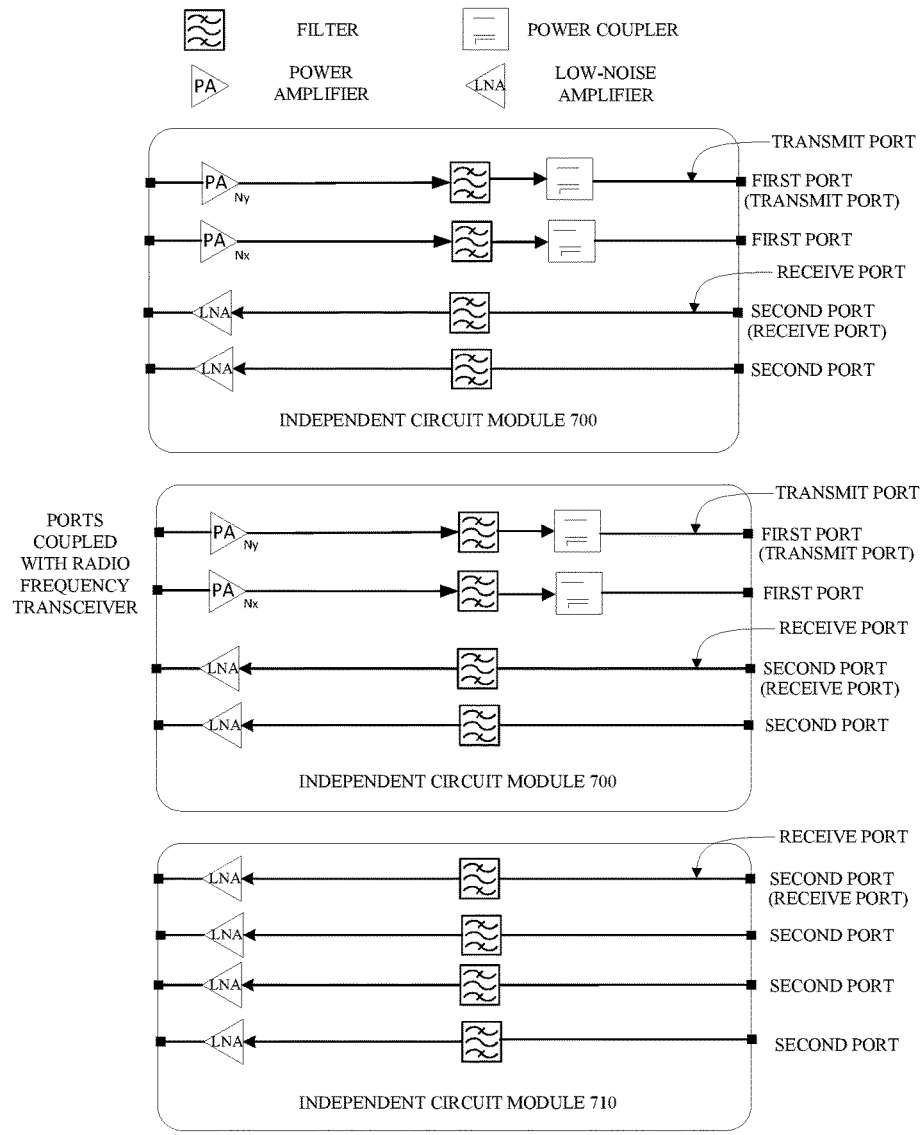
FIG. 7 is still another schematic structural diagram illustrating a radio frequency circuit according to an implementation of the present disclosure.

In a possible implementation, as illustrated in FIG. 7, the radio frequency circuit of the electronic device logically includes four transmitter circuits and eight receiver circuits. The radio frequency circuit physically includes three independent circuit modules. At least one of the three independent circuit modules includes multiple transmit ports, and each transmit port is configured to be coupled with a corresponding first T port (i.e., one of four first T ports). The three independent circuit modules have multiple receive ports, and each receive port is configured to be coupled with a corresponding second T port (i.e., one of eight second T ports). That is, the multiple transmit ports of the three independent circuit modules and multiple first T ports of the multiway switch are in one-to-one correspondence, and the multiple receive ports of the three independent circuit modules and multiple second T ports of the multiway switch are in one-to-one correspondence.

As one implementation, the three independent circuit modules include two first independent circuit modules and one second independent circuit module. The two first independent circuit modules are embodied as two independent circuit modules 700 and the second independent circuit module is embodied as an independent circuit module 710. The independent circuit module 700 includes multiple first ports and multiple second ports, each first port is configured to be coupled with one of the four first T ports of the multiway switch, and each second port of the independent circuit module 700 is configured to be coupled with one of the eight second T ports of the multiway switch. The independent circuit module 710 includes multiple second ports, and each second port of the independent circuit module 710 is configured to be coupled with one of the eight second T ports of the multiway switch.

The independent circuit module 700 includes two transmitter circuits operable at different working frequency bands and two receiver circuits, each of the two transmitter circuits has one transmit port coupled with one of the first ports of the independent circuit module 700, and each of the two receiver circuits has one receive port coupled with one of the second ports of the independent circuit module 700.

The independent circuit module 710 includes four receiver circuits, and each of the four receiver circuits has one receive port coupled with one of the second ports of the independent circuit module 710.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 8:
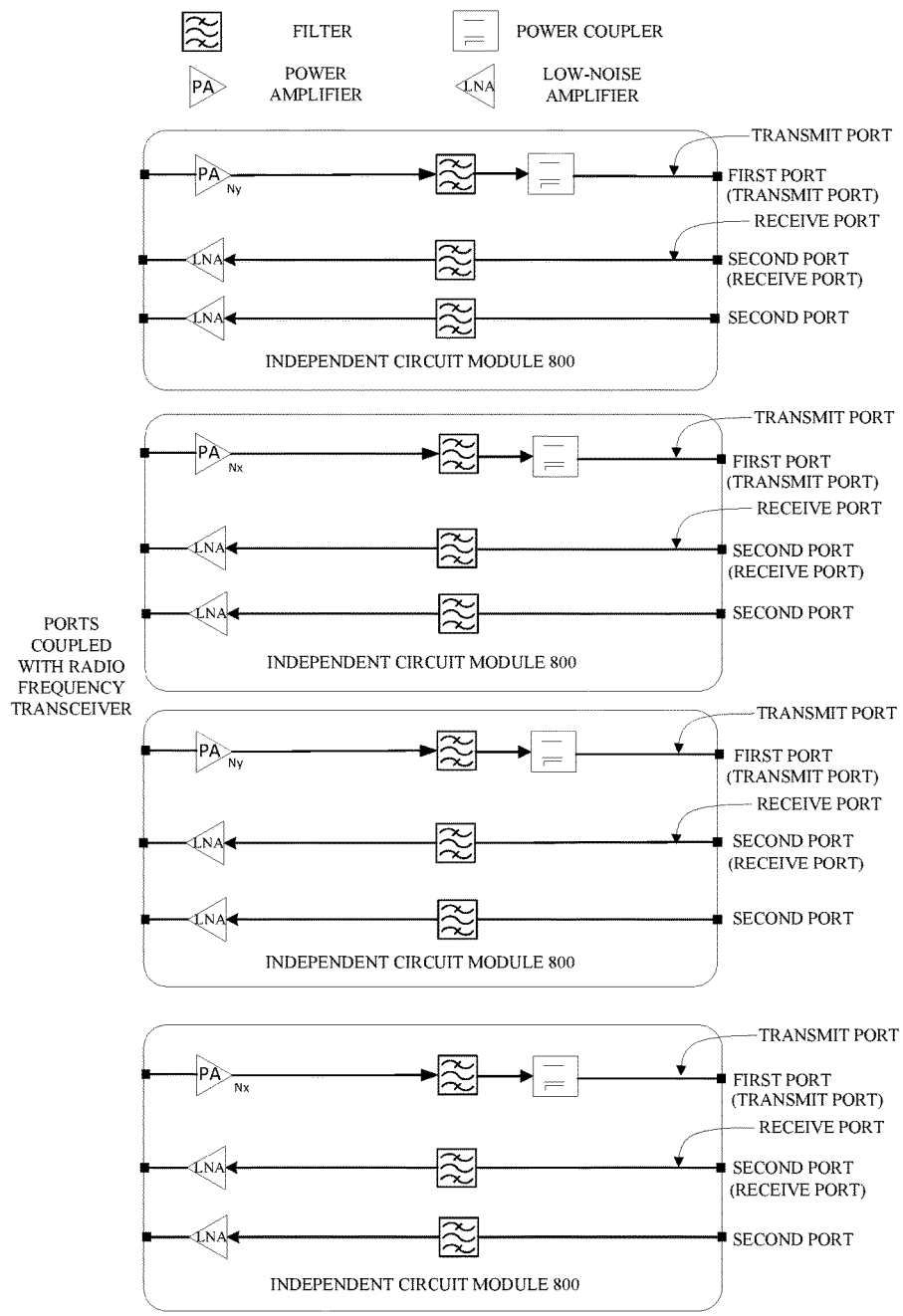
FIG. 8 is still another schematic structural diagram illustrating a radio frequency circuit according to an implementation of the present disclosure.

In a possible implementation, as illustrated in FIG. 8, the radio frequency circuit of the electronic device logically includes four transmitter circuits and eight receiver circuits. The radio frequency circuit physically includes four independent circuit modules. At least one of the four independent circuit modules includes multiple transmit ports, and each transmit port is configured to be coupled with a corresponding first T port (i.e., one of four first T ports). The four independent circuit modules have multiple receive ports, and each receive port is configured to be coupled with a corresponding second T port (i.e., one of eight second T ports). That is, the multiple transmit ports of the four independent circuit modules and multiple first T ports of the multiway switch are in one-to-one correspondence, and the multiple receive ports of the four independent circuit modules and multiple second T ports of the multiway switch are in one-to-one correspondence.

As one implementation, the four independent circuit modules include four first independent circuit modules. The four first independent circuit modules are embodied as four independent circuit modules 800. The independent circuit module 800 includes a first port and multiple second ports, the first port is configured to be coupled with one of the four first T ports of the multiway switch, and each second port is configured to be coupled with one of the eight second T ports of the multiway switch.

The independent circuit module 800 includes one transmitter circuit and two receiver circuits, the transmitter circuit has a transmit port coupled with the first port of the independent circuit module 800, and each of the two receiver circuits has one receive port coupled with one of the second ports of the independent circuit module 800.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 9:
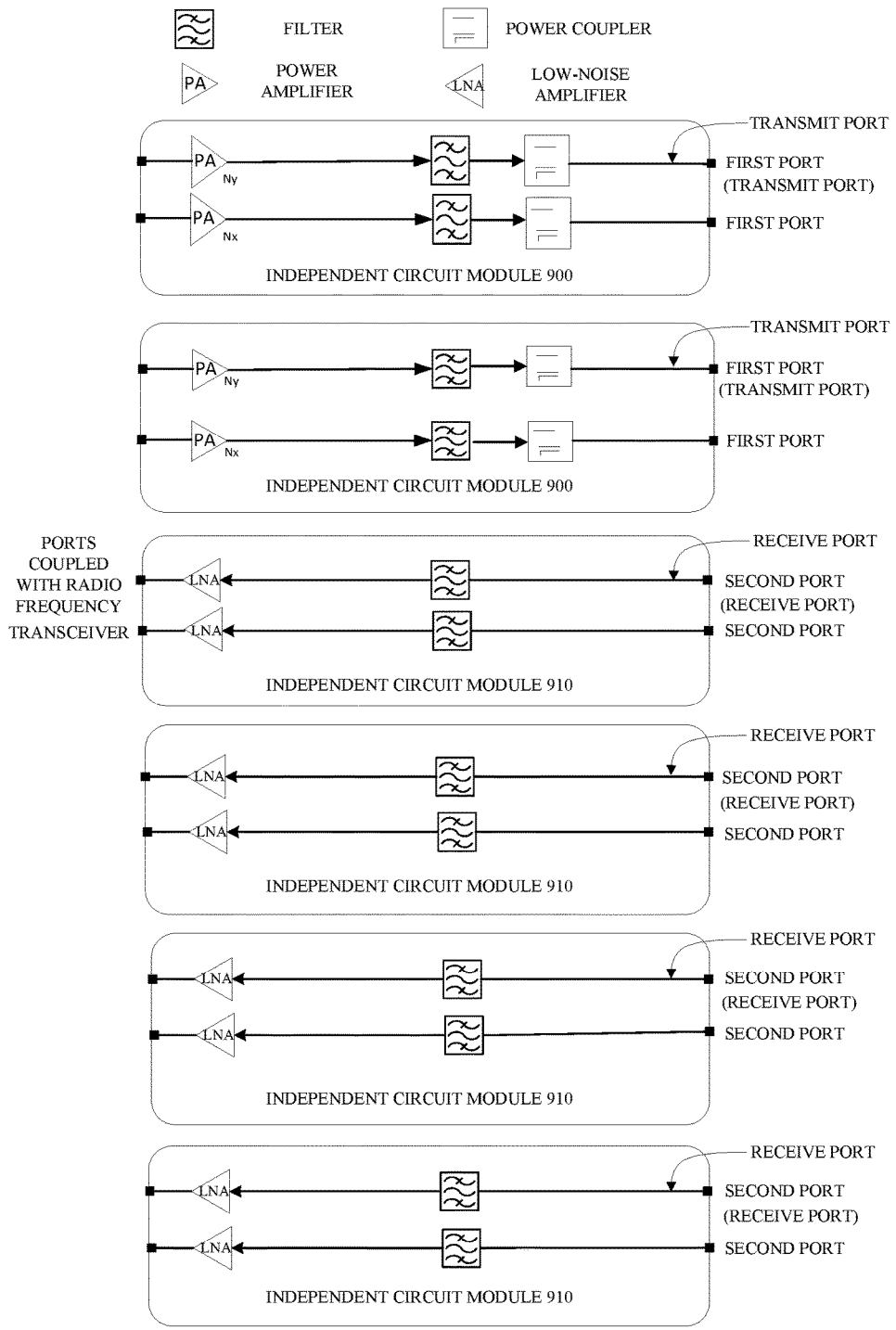
FIG. 9 is still another schematic structural diagram illustrating a radio frequency circuit according to an implementation of the present disclosure.

In a possible implementation, as illustrated in FIG. 9, the radio frequency circuit of the electronic device logically includes four transmitter circuits and eight receiver circuits. The radio frequency circuit physically includes six independent circuit modules. At least one of the six independent circuit modules includes multiple transmit ports, and each transmit port is configured to be coupled with a corresponding first T port (i.e., one of four first T ports). The six independent circuit modules have multiple receive ports, and each receive port is configured to be coupled with a corresponding second T port (i.e., one of eight second T ports). That is, the multiple transmit ports of the six independent circuit modules and multiple first T ports of the multiway switch are in one-to-one correspondence, and the multiple receive ports of the six independent circuit modules and multiple second T ports of the multiway switch are in one-to-one correspondence.

As one implementation, the six independent circuit modules include two first independent circuit modules and four second independent circuit modules. The two first independent circuit modules are embodied as two independent circuit modules 900 and the four second independent circuit modules are embodied as four independent circuit modules 910. The independent circuit module 900 includes multiple first ports, and each first port is configured to be coupled with one of the four first T ports of the multiway switch. The independent circuit module 910 includes multiple second ports, and each second port is configured to be coupled with one of the eight second T ports of the multiway switch.

The independent circuit module 900 includes two transmitter circuits operable at different working frequency bands, and each of the two transmitter circuits has one transmit port coupled with one of the first ports of the independent circuit module 900.

The independent circuit module 910 includes two receiver circuits, and each of the two receiver circuit has one receive port coupled with one of the second ports of the independent circuit module 910.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 10:
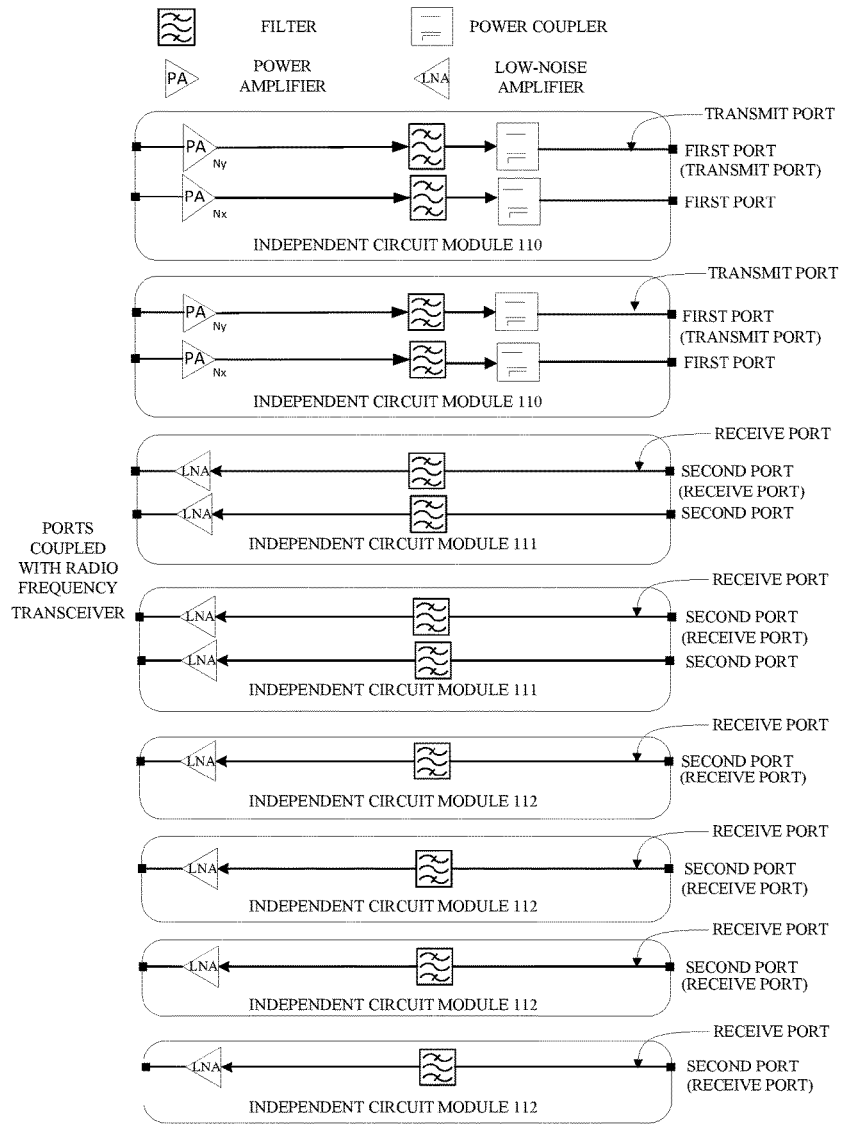
FIG. 10 is still another schematic structural diagram illustrating a radio frequency circuit according to an implementation of the present disclosure.

In a possible implementation, as illustrated in FIG. 10, the radio frequency circuit of the electronic device logically includes four transmitter circuits and eight receiver circuits. The radio frequency circuit physically includes eight independent circuit modules. At least one of the eight independent circuit modules includes multiple transmit ports, and each transmit port is configured to be coupled with a corresponding first T port (i.e., one of four first T ports). The eight independent circuit modules have multiple receive ports, and each receive port is configured to be coupled with a corresponding second T port (i.e., one of eight second T ports). That is, the multiple transmit ports of the eight independent circuit modules and multiple first T ports of the multiway switch are in one-to-one correspondence, and the multiple receive ports of the eight independent circuit modules and multiple second T ports of the multiway switch are in one-to-one correspondence.

As one implementation, the eight independent circuit modules include two first independent circuit modules, two second independent circuit modules, and four third independent circuit modules. The two first independent circuit modules are embodied as two independent circuit modules 110, the two second independent circuit modules are embodied as two independent circuit modules 111, and the four third independent circuit modules are embodied as four independent circuit modules 112. The independent circuit module 110 includes multiple first ports, and each first port is configured to be coupled with one of the four first T ports of the multiway switch. The independent circuit module 111 includes multiple second ports as well as the independent circuit module 112 includes a second port, and each second port is configured to be coupled with one of the eight second T ports of the multiway switch.

The independent circuit module 110 includes two transmitter circuits of different working frequency bands, and each of the two transmitter circuit has one transmit port coupled with one of the first ports of the independent circuit module 110.

The independent circuit module 111 includes two receiver circuits, and each of the two receiver circuit has one receive port coupled with one of the second ports of the independent circuit module 111.

The independent circuit module 112 includes a receiver circuit having a receive port coupled with the second port of the independent circuit module 112.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

Figure 11:
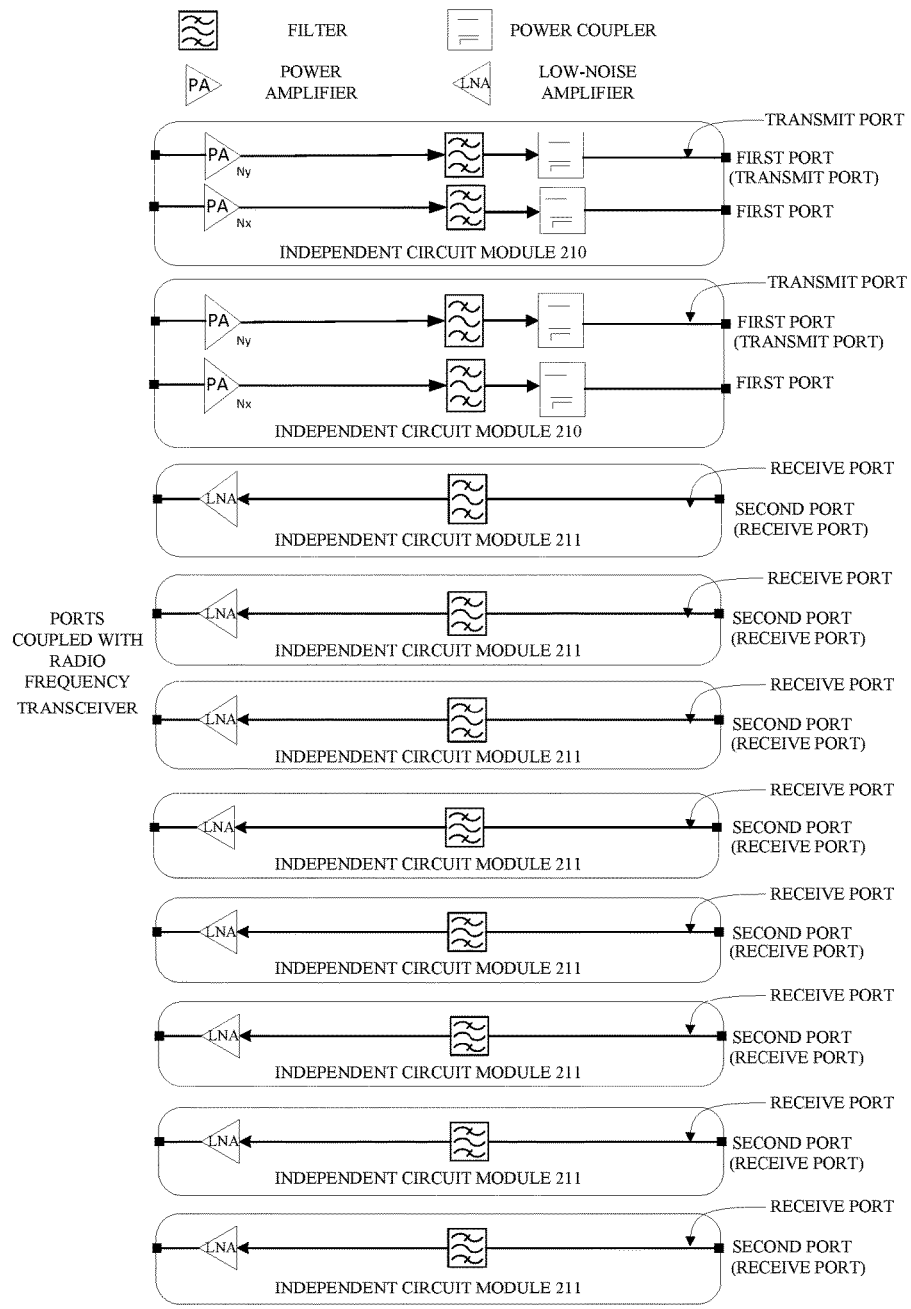
FIG. 11 is still another schematic structural diagram illustrating a radio frequency circuit according to an implementation of the present disclosure.

In a possible implementation, as illustrated in FIG. 11, the radio frequency circuit of the electronic device logically includes four transmitter circuits and eight receiver circuits. The radio frequency circuit physically includes ten independent circuit modules. At least one of the ten independent circuit modules includes multiple transmit ports, and each transmit port is configured to be coupled with a corresponding first T port (i.e., one of four first T ports). The ten independent circuit modules have multiple receive ports, and each receive port is configured to be coupled with a corresponding second T port (i.e., one of eight second T ports). That is, the multiple transmit ports of the ten independent circuit modules and multiple first T ports of the multiway switch are in one-to-one correspondence, and the multiple receive ports of the ten independent circuit modules and multiple second T ports of the multiway switch are in one-to-one correspondence.

As one implementation, the ten independent circuit modules include two first independent circuit modules and eight second independent circuit modules. The two first independent circuit modules are embodied as two independent circuit modules 210 and the eight second independent circuit modules are embodied as eight independent circuit modules 211. The independent circuit module 210 includes multiple first ports, and each first port is configured to be coupled with one of the four first T ports of the multiway switch. The independent circuit module 211 includes a second port configured to be coupled with one of the eight second T ports of the multiway switch.

The independent circuit module 210 includes two transmitter circuits of different working frequency bands, and each of the two transmitter circuit has one transmit port coupled with one of the first ports of the independent circuit module 210.

The independent circuit module 211 includes one receiver circuit having a receive port coupled with the second port of the independent circuit module 211.

As can be seen, in the implementation, the electronic device includes the antenna system, the radio frequency circuit, and the multiway switch. The antenna system includes the four antennas. The multiway switch includes the twelve T ports and the four P ports. The multiway switch is configured to be coupled with the radio frequency circuit and the antenna system to enable a function of the electric device of transmitting an SRS through the four antennas corresponding to the four P ports in turn.

It should be noted that, specific implementation manners of the receiver circuits and the transmitter circuits mentioned-above may vary, and the implementations of the disclosure are not particularly restricted. The "transmit-receive port", "transmit port", or "receive port" herein refers to a port (may be composed of one or more components) which implements a corresponding transmission and/or reception function and is located on the path of a transmitter circuit, on the path of a receiver circuit, or located on the path after integration of one or more transmitter circuits and/or one or more receiver circuits. It should be noted that the ports such as transmit ports, receive ports, and transmit-receive ports illustrated in the figures are exemplary and do not intend to indicate an exact port position and impose any restrictions. It should be noted that, "module" herein can refer to circuits and any combination of related components.

In one possible implementation, the receiver circuit includes an LNA and a filter. The filter of the receiver circuit has an input port coupled with a corresponding second port of an independent circuit module, the filter of the receiver circuit has an output port coupled with an input port of the LNA, and the LNA has an output port coupled with a corresponding port of a radio frequency (RF) transceiver.

In one possible implementation, the transmitter circuit includes a PA, a filter, and a power coupler. The PA has an input port coupled with a corresponding port of the RF transceiver, the PA has an output port coupled with an input port of the filter of the transmitter circuit. The filter of the transmitter circuit has an output port coupled with an input port of the power coupler, and the power coupler has an output port coupled with a corresponding first port of an independent circuit module.

As an implementation, the four antennas include a first antenna, a second antenna, a third antenna, and a fourth antenna. These four antennas are all operable at a fifth generation new radio (5G NR) frequency band.

As another implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

The first and fourth antennas are configured to support DL 4×4 MIMO of some frequency bands in LTE on terminals. These two receive antennas are shared with the 5G NR antenna (hereinafter, "shared antennas" for short). The LTE frequency band may include, for example, 1880-1920 MHz and 2496-2690 MHz.

It can be seen that, in the implementations, when two PAs at the same frequency band work simultaneously (i.e., corresponding to an UL MIMO mode), a transmit power will be high at this time, and two signals will interfere with each other. In addition, heat dissipation efficiency can be affected when the two PAs work simultaneously. Considering this, two independent circuit modules are needed to set the PAs of transmitter circuits, which is beneficial to reducing interference and improving signal processing efficiency and heat dissipation efficiency of the radio frequency system.

Figure 12:
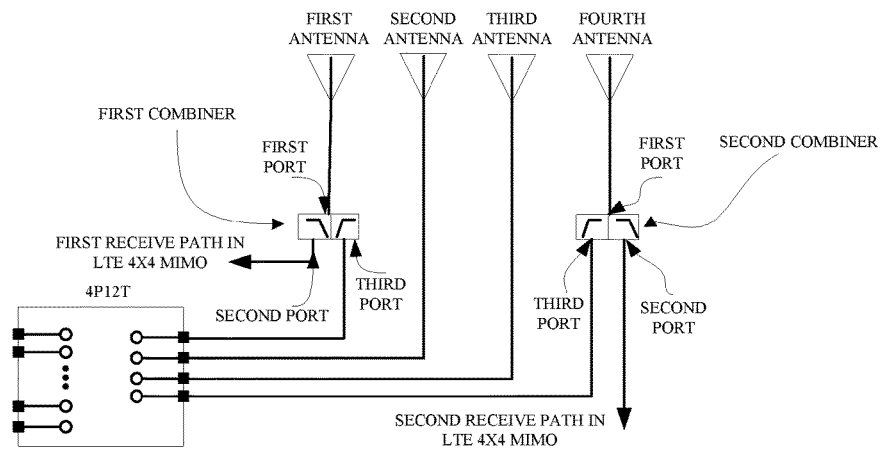
FIG. 12 is a schematic structural diagram illustrating an antenna system of an electronic device according to an implementation of the present disclosure.

In a possible implementation, as illustrated in FIG. 12, the antenna system further includes a first combiner and a second combiner. The first combiner has a first port coupled with the first antenna, a second port coupled with a first receive path in long term evolution 4×4 multiple-input multiple-output (LTE 4×4 MIMO) configuration of the electronic device, and a third port coupled with a corresponding P port of the four P ports of the multiway switch. The second combiner has a first port coupled with the fourth antenna, a second port coupled with a second receive path in LTE 4×4 MIMO configuration of the electronic device, and a third port coupled with a corresponding P port of the four P ports of the multiway switch.

The LTE 4*4 MIMO is a downlink LTE receive circuit and can be defined as a third receive path. Since the LTE currently has two receive paths, in order to support LTE 4×4 MIMO, the third receive path and a fourth receive path are added.

According to performance of the four antennas, the electronic device will configure one antenna with better performance for the circuit for PRX (primary receiver), and the antenna will be in a standby state. Moreover, first T ports in the switch having both the transmission function and the reception function can be configured for TX (transmit) and PRX purpose, and thus the antenna can be switched arbitrarily. In this way, there is no need to restrict the coupling between ports of shared antennas.

Figure 13:
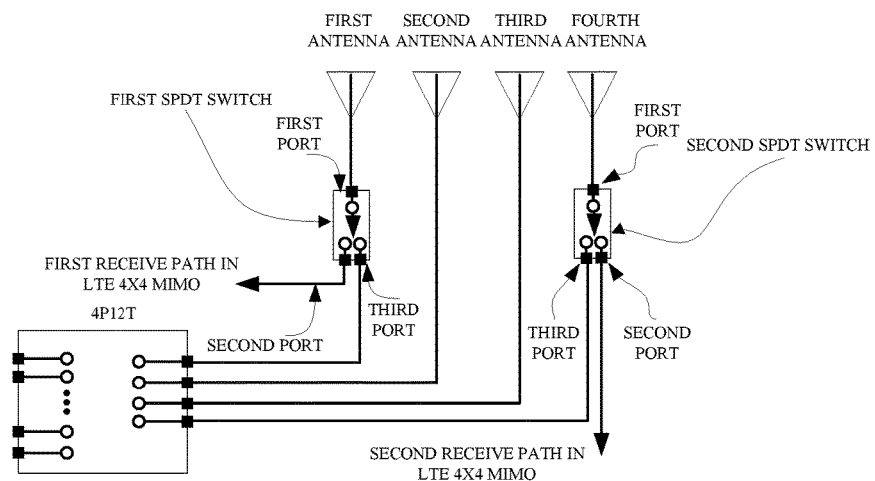
FIG. 13 is a schematic structural diagram illustrating another antenna system of the electronic device according to an implementation of the present disclosure.

In a possible implementation, as illustrated in FIG. 13, the antenna system further includes a first single-pole double-throw (SPDT) switch and a second SPDT switch. The first SPDT switch has a first port coupled with the first antenna, a second port coupled with a first receive path in LTE 4×4 MIMO configuration of the electronic device, and a third port coupled with a corresponding P port of the four P ports of the multiway switch. The second SPDT switch has a first port coupled with the fourth antenna, a second port coupled with a second receive path in LTE 4×4 MIMO configuration of the electronic device, and a third port coupled with a corresponding P port of the four P ports of the multiway switch.

Figure 14:
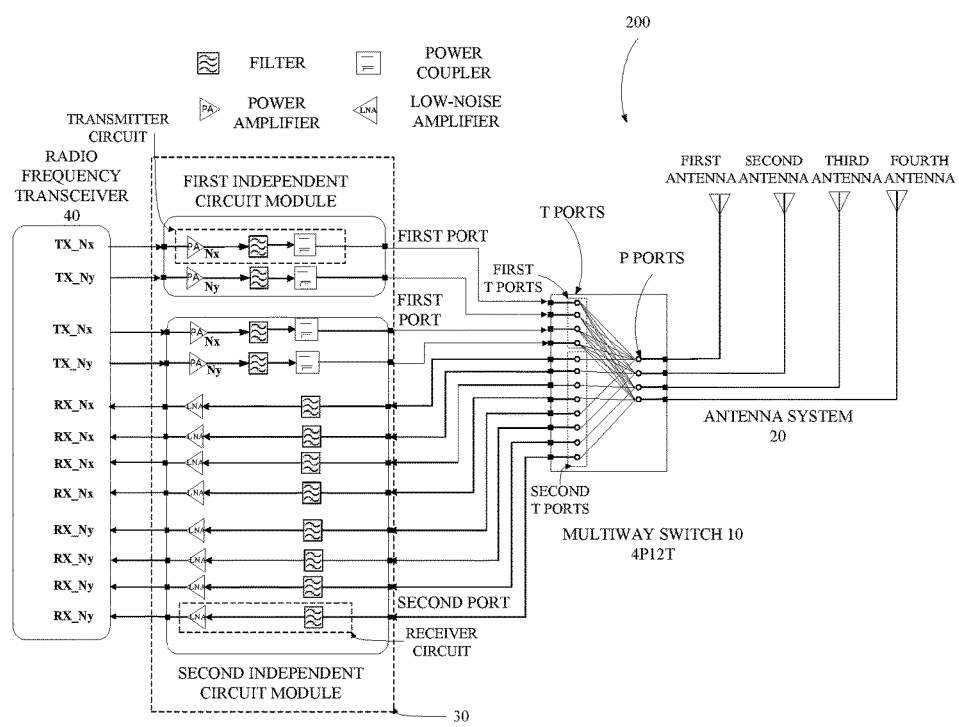
FIG. 14 is a schematic structural diagram illustrating a radio frequency system according to an implementation of the present disclosure.

FIG. 14 is a schematic structural diagram illustrating a radio frequency system 200 according to an implementation of the present disclosure. As illustrated in FIG. 14, the radio frequency system 200 includes an antenna system 20, a radio frequency transceiver 40, a radio frequency circuit 30 coupled with the radio frequency transceiver 40, and the multiway switch 10 according to any of the above implementations.

As an implementation, the multiway switch 10 includes twelve T ports and four P ports. The twelve T ports include four first T ports and each first T port is coupled with all of the four P ports. The antenna system 20 includes four antennas corresponding to the four P ports. The multiway switch 10 is configured to enable a preset function of transmitting an SRS through the four antennas in turn.

For example, the overall architecture of the radio frequency system 200 of the electronic device is illustrated in FIG. 14. When the electronic device transmits data through a frequency band Nx, the working process of the radio frequency system 200 is as follows. A radio frequency transceiver 40 sends, through a transmit port TX_Nx at the frequency band Nx, a transmit signal to a PA of a first independent circuit module coupled with the transmit port TX_Nx. The PA sends the transmit signal received to a first port of the first independent circuit module through a filter of a transmitter circuit. Due to the fact that a first T port of the multiway switch 10 to which the first port coupled is a fully coupled port supporting a signal transmission function, the first port can send four transmit signals to four P ports through the first T port of the multiway switch 10 in the same time period. In this situation, the four P ports transmit the four transmit signals through antennas corresponding to each P port, to transmit four channels of data to external devices simultaneously.

Similarly, when the electronic device receives data through a frequency band Ny, the working process of the radio frequency system 200 is as follows. The four antennas send four receive signals respectively to the four P ports of the multiway switch 10 in the same time period. The four P ports send the four receive signals respectively to four second T ports of the multiway switch 10, each of the four second T ports receives one receive signal from each of the four P ports respectively. Each of the four second T ports sends, through a second port of a second independent circuit module, the receive signal to each of four receiver circuits of the second independent circuit module, where each receiver circuit corresponds to a receive port RX_Ny of a frequency band Ny of the radio frequency transceiver 40. Each receiver circuit sends the receive signal received to the receive port RX_Ny of the frequency band Ny of the radio frequency transceiver 40 through a filter and an LNA, thereby implementing four receive-signal paths of the electronic device.

Figure 15:
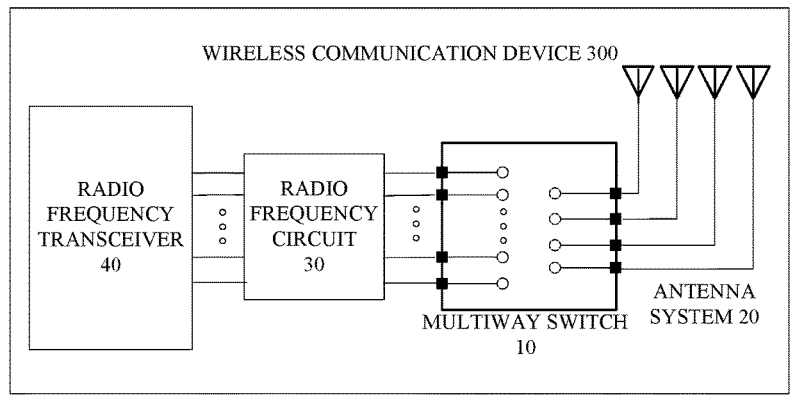
FIG. 15 is a schematic structural diagram illustrating a wireless communication device according to an implementation of the present disclosure.

FIG. 15 is a schematic structural diagram illustrating a wireless communication device 300 according to an implementation of the present disclosure. As illustrated in FIG. 15, the wireless communication device 300 (for example can be a terminal device, a base station, and the like) includes an antenna system 20, a radio frequency transceiver 40, a radio frequency circuit 30 coupled with the radio frequency transceiver 40, and a multiway switch 10 described in any of the above implementations.

As an implementation, the antenna system 20 includes four antennas. The multiway switch 10 includes twelve T ports and four P ports. The twelve T ports include four first T ports supporting only a transmission function and eight second T ports supporting only a reception function. Each first T port is coupled with all of the four P ports. Each second T port is coupled with one of the four P ports, and any two second T ports operable at the same frequency band are coupled with different P ports of the four P ports. Each of the four P ports is coupled with a corresponding antenna. The multiway switch 10 is configured to enable a preset function of transmitting an SRS through four antennas corresponding to four P ports in turn.

As another implementation, the antenna system 20 further includes a first combiner and a second combiner. The first combiner has a first port coupled with the first antenna, a second port coupled with a first receive path in long term evolution 4×4 multiple-input multiple-output (LTE 4×4 MIMO) configuration of the wireless communication device 300, and a third port coupled with a corresponding P port of the four P ports of the multiway switch 10. The second combiner has a first port coupled with the fourth antenna, a second port coupled with a second receive path in LTE 4×4 MIMO configuration of the wireless communication device 300, and a third port coupled with a corresponding P port of the four P ports of the multiway switch 10.

Figure 16:
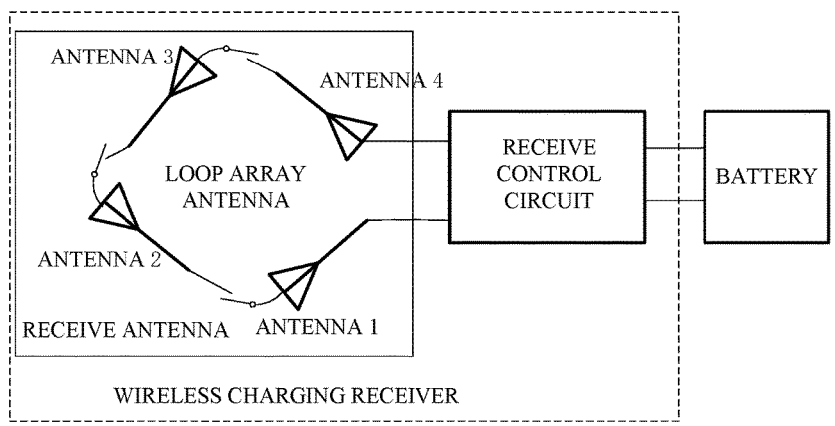
FIG. 16 is a schematic diagram illustrating a wireless charging receiver for multiplexing an antenna of a wireless communication device according to an implementation of the present disclosure.

In addition, as illustrated in FIG. 16, the four antennas of the antenna system described in the implementations of the disclosure can also be multiplexed by a wireless charging receiver of the electronic device. In an implementation, the wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to a battery for charging. The receive control circuit can dynamically adjust a frequency of the loop array antenna and enable the frequency of the loop array antenna to be matched with frequencies of the transmit antennas of the wireless charging transmitter, so as to achieve paired charging. Alternatively, the receive control circuit interacts with the wireless charging transmitter in real time on a frequency change range to implement an "exclusive encryption" wireless charging mode.

The receive antenna may be an antenna include at least one of four antennas (When the receive antenna is composed more than one antenna, the antenna is strobed via the switch between the antennas).

Figure 17:
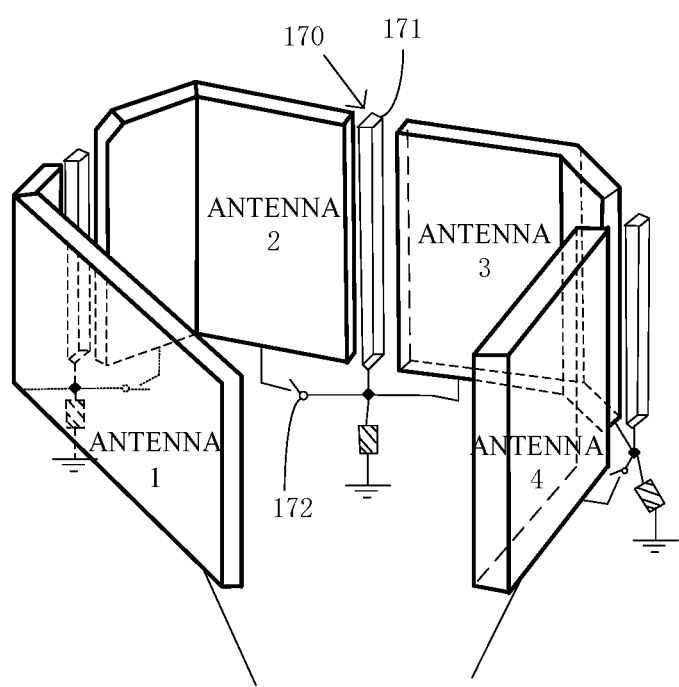
FIG. 17 is a schematic structural diagram illustrating a loop array antenna composed of four antennas according to an implementation of the present disclosure.

For example, as illustrated in FIG. 17, the receive antenna is the loop array antenna composed of four antennas. The four antennas include antenna 1, antenna 2, antenna 3, and antenna 4. Antenna 1 and antenna 4 are operable at both a LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device can conduct the switch 172 of each gate circuit 170 in a wireless charging mode to form a loop array antenna for receiving energy. By adding the spacers 171 among the antennas, the gate circuit 170 can reduce mutual coupling among the multiple antennas of the electronic device in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since antenna 1 and antenna 4 have capabilities stronger than that of antenna 2 and antenna 3, the loop array antenna thus arranged can reduce energy loss in transmission as much as possible.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, comprising:
twelve throw (T) ports and four pole (P) ports; the twelve T ports comprising four first T ports and each first T port being coupled with all of the four P ports; and
the multiway switch being configured to be coupled with a radio frequency circuit and an antenna system of an electronic device operable in a dual-frequency dual-transmit mode, to enable a preset function of the electronic device, the antenna system comprising four antennas corresponding to the four P ports, and the preset function being a function of transmitting a sounding reference signal (SRS) through the four antennas in turn.

2. The multiway switch of claim 1, wherein
the twelve T ports further comprise eight second T ports, each of the eight second T ports is coupled with one of the four P ports, and among the eight second T ports, second T ports operable at the same frequency band are coupled with different P ports of the four P ports;
each of the four P ports is coupled with a corresponding antenna;
the four first T ports only support a transmission function; and
the eight second T ports only support a reception function.

3. The multiway switch of claim 2, wherein
the radio frequency circuit of the electronic device logically comprises four transmitter circuits and eight receiver circuits;
the radio frequency circuit physically comprises two independent circuit modules; and
the two independent circuit modules have transmit ports and receive ports, each transmit port is configured to be coupled with one of the four first T ports, and each receive port is configured to be coupled with one of the eight second T ports.

4. The multiway switch of claim 3, wherein the two independent circuit modules comprise one first independent circuit module and one second independent circuit module; wherein the first independent circuit module and the second independent circuit module each comprise first ports and second ports, each first port is configured to be coupled with one of the four first T ports of the multiway switch, and each second port is configured to be coupled with one of the eight second T ports of the multiway switch;
wherein the first independent circuit module comprises two transmitter circuits operable at different working frequency bands and four receiver circuits, each of the two transmitter circuits of the first independent circuit module has one transmit port coupled with one of the first ports of the first independent circuit module, and each of the four receiver circuits of the first independent circuit module has one receive port coupled with one of the second ports of the first independent circuit module; and wherein the second independent circuit module comprises two transmitter circuits operable at different working frequency bands and four receiver circuits, each of the two transmitter circuits of the second independent circuit module has one transmit port coupled with one of the first ports of the second independent circuit module, and each of the four receiver circuits of the second independent circuit module has one receive port coupled with one of the second ports of the second independent circuit module.

5. The multiway switch of claim 3, wherein the two independent circuit modules comprise one first independent circuit module and one second independent circuit module; wherein the first independent circuit module comprises first ports, and each first port of the first independent circuit module is configured to be coupled with one of the four first T ports of the multiway switch; wherein the second independent circuit module comprises first ports and second ports, each first port of the second independent circuit module is configured to be coupled with one of the four first T ports of the multiway switch, and each second port is configured to be coupled with one of the eight second T ports of the multiway switch;

wherein the first independent circuit module comprises two transmitter circuits of different working frequency bands, and each of the two transmitter circuit of the first independent circuit module has one transmit port coupled with one of the first ports of the first independent circuit module; and wherein the second independent circuit module comprises two transmitter circuits of different working frequency bands and eight receiver circuits, each of the two transmitter circuits of the second independent circuit module has one transmit port coupled with one of the first ports of the second independent circuit module, and each of the eight receiver circuits has one receive port coupled with one of the second ports of the second independent circuit module.

6. The multiway switch of claim 2, wherein the radio frequency circuit of the electronic device logically comprises four transmitter circuits and eight receiver circuits; and the radio frequency circuit physically comprises three independent circuit modules, wherein at least one independent circuit module of the three independent circuit modules comprises transmit ports, and each transmit port is configured to be coupled with one of the four first T ports; and the three independent circuit modules have receive ports, and each receive port is configured to be coupled with one of the eight second T ports.

7. The multiway switch of claim 6, wherein the three independent circuit modules comprise two first independent circuit modules and one second independent circuit module; wherein the first independent circuit module comprises first ports, and each first port is configured to be coupled with one of the four first T ports of the multiway switch; wherein the second independent circuit module comprises second ports, and each second port is configured to be coupled with one of the eight second T ports of the multiway switch;

wherein the first independent circuit module comprises two transmitter circuits operable at different working frequency bands, and each of the two transmitter circuits has one transmit port coupled with one of the first ports of the first independent circuit module; and wherein the second independent circuit module comprises eight receiver circuits, and each of the eight receiver circuits has one receive port coupled with one of the second ports of the second independent circuit module.

8. The multiway switch of claim 6, wherein the three independent circuit modules comprise two first independent circuit modules and one second independent circuit module; wherein the first independent circuit module comprises first ports and second ports, each first port is configured to be coupled with one of the four first T ports of the multiway switch, and each second port of the first independent circuit module is configured to be coupled with one of the eight second T ports of the multiway switch; wherein the second independent circuit module comprises second ports, and each second port of the second independent circuit module is configured to be coupled with one of the eight second T ports of the multiway switch;

wherein the first independent circuit module comprises two transmitter circuits operable at different working frequency bands and two receiver circuits, each of the two transmitter circuits has one transmit port coupled with one of the first ports of the first independent circuit module, and each of the two receiver circuits has one receive port coupled with one of the second ports of the first independent circuit module; and wherein the second independent circuit module comprises four receiver circuits, and each of the four receiver circuits has one receive port coupled with one of the second ports of the second independent circuit module.

9. The multiway switch of claim 2, wherein the radio frequency circuit of the electronic device logically comprises four transmitter circuits and eight receiver circuits; and the radio frequency circuit physically comprises four independent circuit modules, wherein at least one independent circuit module of the four independent circuit modules comprises transmit ports, and each transmit port is configured to be coupled with one of the four first T ports; and the four independent circuit modules have receive ports, and each receive port is configured to be coupled with one of the eight second T ports.

10. The multiway switch of claim 9, wherein the four independent circuit modules comprise four first independent circuit modules; wherein the first independent circuit module comprises a first port and second ports, the first port is configured to be coupled with one of the four first T ports of the multiway switch, and each second port is configured to be coupled with one of the eight second T ports of the multiway switch; and wherein the first independent circuit module comprises one transmitter circuit and two receiver circuits, the transmitter circuit has a transmit port coupled with the first port of the first independent circuit module, and each of the two receiver circuits has one receive port coupled with one of the second ports of the first independent circuit module.

11. The multiway switch of claim 2, wherein the radio frequency circuit of the electronic device logically comprises four transmitter circuits and eight receiver circuits; and the radio frequency circuit physically comprises six independent circuit modules, wherein at least one independent circuit module of the six independent circuit modules comprises transmit ports, and each transmit port is configured to be coupled with one of the four first T ports; and the six independent circuit modules have receive ports, and each receive port is configured to be coupled with one of the eight second T ports.

12. The multiway switch of claim 11, wherein the six independent circuit modules comprise two first independent circuit modules and four second independent circuit modules; wherein the first independent circuit module comprises first ports, and each first port is configured to be coupled with one of the four first T ports of the multiway switch; wherein the second independent circuit module comprises second ports, and each second port is configured to be coupled with one of the eight second T ports of the multiway switch;
- wherein the first independent circuit module comprises two transmitter circuits operable at different working frequency bands, and each of the two transmitter circuits has one transmit port coupled with one of the first ports of the first independent circuit module; and
- wherein the second independent circuit module comprises two receiver circuits, and each of the two receiver circuit has one receive port coupled with one of the second ports of the second independent circuit module.

13. The multiway switch of claim 2, wherein
the radio frequency circuit of the electronic device logically comprises four transmitter circuits and eight receiver circuits; and
the radio frequency circuit physically comprises eight independent circuit modules, wherein
- at least one independent circuit module of the eight independent circuit modules comprises transmit ports, and each transmit port is configured to be coupled with one of the four first T ports; and
- the eight independent circuit modules have receive ports, and each receive port is configured to be coupled with one of the eight second T ports.

14. The multiway switch of claim 13, wherein the eight independent circuit modules comprise two first independent circuit modules, two second independent circuit modules, and four third independent circuit modules; wherein the first independent circuit module comprises first ports, and each first port is configured to be coupled with one of the four first T ports of the multiway switch; wherein the second independent circuit module comprises second ports as well as the third independent circuit module comprises a second port, each second port is configured to be coupled with one of the eight second T ports of the multiway switch;
- wherein the first independent circuit module comprises two transmitter circuits of different working frequency bands, and each of the two transmitter circuit has one transmit port coupled with one of the first ports of the first independent circuit module;
- wherein the second independent circuit module comprises two receiver circuits, and each of the two receiver circuit has one receive port coupled with one of the second ports of the second independent circuit module; and
- wherein the third independent circuit module comprises one receiver circuit having a receive port coupled with the second port of the third independent circuit module.

15. The multiway switch of claim 2, wherein
the radio frequency circuit of the electronic device logically comprises four transmitter circuits and eight receiver circuits; and
the radio frequency circuit physically comprises ten independent circuit modules, wherein
- at least one independent circuit module of the ten independent circuit modules comprises transmit ports, and each transmit port is configured to be coupled with one of the four first T ports; and
- the ten independent circuit modules have receive ports, and each receive port is configured to be coupled with one of the eight second T ports.

16. The multiway switch of claim 15, wherein the ten independent circuit modules comprise two first independent circuit modules and eight second independent circuit modules; wherein the first independent circuit module comprises first ports, and each first port is configured to be coupled with one of the four first T ports of the multiway switch; wherein the second independent circuit module comprises a second port configured to be coupled with one of the eight second T ports of the multiway switch;
- wherein the first independent circuit module comprises two transmitter circuits of different working frequency bands, and each of the two transmitter circuit has one transmit port coupled with one of the first ports of the first independent circuit module; and
- wherein the second independent circuit module comprises one receiver circuit having a receive port coupled with the second port of the second independent circuit module.

17. The multiway switch of claim 3, wherein
the receiver circuit comprises a low-noise amplifier (LNA) and a filter; the filter of the receiver circuit has an input port coupled with a second port of an independent circuit module, the filter of the receiver circuit has an output port coupled with an input port of the LNA, and the LNA has an output port coupled with a corresponding port of a radio frequency (RF) transceiver; and
the transmitter circuit comprises a power amplifier (PA), a filter, and a power coupler, the PA has an input port coupled with a corresponding port of the RF transceiver, the PA has an output port coupled with an input port of the filter of the transmitter circuit, the filter of the transmitter circuit has an output port coupled with an input port of the power coupler, and the power coupler has an output port coupled with a first port of an independent circuit module.

18. A radio frequency system, comprising an antenna system, a radio frequency transceiver, a radio frequency circuit coupled with the radio frequency transceiver, and a multiway switch coupled with the radio frequency circuit and the antenna system;
the multiway switch comprising twelve T ports and four P ports; the twelve T ports comprising four first T ports and each first T port being coupled with all of the four P ports;
the antenna system comprising four antennas corresponding to the four P ports; and
the multiway switch being configured to enable a preset function of transmitting an SRS through the four antennas in turn.

19. A wireless communication device, comprising a radio frequency transceiver, a radio frequency circuit coupled with the radio frequency transceiver, an antenna system, and a multiway switch coupled with the radio frequency circuit and the antenna system;
the antenna system comprising four antennas;
the multiway switch comprising twelve T ports and four P ports;
the twelve T ports comprising four first T ports supporting only a transmission function and eight second T ports supporting only a reception function; each first T port being coupled with all of the four P ports, each second T port being coupled with one of the four P ports, and any two second T ports operable at the same frequency band being coupled with different P ports of the four P ports;

each of the four P ports being coupled with a corresponding antenna; and the multiway switch being configured to enable a preset function of transmitting an SRS through the four antennas corresponding to the four P ports in turn.

20. The wireless communication device of claim 19, wherein the antenna system further comprises:

a first combiner, comprising:
  a first port, coupled with a first antenna;
  a second port, coupled with a first receive path in long term evolution 4×4 multiple-input multiple-output (LTE 4×4 MIMO) configuration of the wireless communication device; and
  a third port, coupled with a corresponding P port of the four P ports of the multiway switch; and a second combiner, comprising:
  a first port, coupled with the fourth antenna;
  a second port, coupled with a second receive path in LTE 4×4 MIMO configuration of the wireless communication device; and
  a third port, coupled with a corresponding P port of the four P ports of the multiway switch.

* * * * *